US012220869B2

(12) United States Patent
Garcia Grau et al.

(10) Patent No.: US 12,220,869 B2
(45) Date of Patent: Feb. 11, 2025

(54) OBJECT ORIENTATION AND/OR POSITION FOR ADDITIVE MANUFACTURING

(71) Applicant: HEWLETT-PACKARD DEVELOPMENT COMPANY, L.P., Spring, TX (US)

(72) Inventors: Marc Garcia Grau, Sant Cugat del Valles (ES); Isabel Sanz Ananos, Sant Cugat del Valles (ES); Alicia Oyonarte Fernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 1042 days.

(21) Appl. No.: 17/051,853

(22) PCT Filed: Oct. 4, 2018

(86) PCT No.: PCT/US2018/054304

§ 371 (c)(1),
(2) Date: Oct. 30, 2020

(87) PCT Pub. No.: WO2020/072057

PCT Pub. Date: Apr. 9, 2020

(65) Prior Publication Data

US 2021/0116880 A1 Apr. 22, 2021

(51) Int. Cl.
*G06F 30/00* (2020.01)
*B22F 10/14* (2021.01)
(Continued)

(52) U.S. Cl.
CPC ............ *B29C 64/386* (2017.08); *B22F 10/14* (2021.01); *B22F 10/85* (2021.01); *B33Y 50/00* (2014.12);
(Continued)

(58) Field of Classification Search
CPC ... B29C 64/386; B29C 64/393; B29C 64/112; B29C 64/165; B33Y 50/00; B33Y 10/00;
(Continued)

(56) References Cited

U.S. PATENT DOCUMENTS 7,403,833 B2 7/2008 Heide et al.
9,747,394 B2 8/2017 Nelaturi et al.
(Continued)

FOREIGN PATENT DOCUMENTS

CN 101542490 A 9/2009
EP 2926982 A1 10/2015
(Continued)

OTHER PUBLICATIONS

Chowdhury, Sushmit, Kunal Mhapsekar, and Sam Anand. "Part build orientation optimization and neural network-based geometry compensation for additive manufacturing process." Journal of Manufacturing Science and Engineering 140.3 (2018): 031009. (Year: 2018).*

(Continued)

*Primary Examiner* — John E Johansen
(74) *Attorney, Agent, or Firm* — Michael Dryja

(57) ABSTRACT

A non-transitory machine-readable storage medium storing instructions executable by a processor described. In some examples, the instructions cause the processor to receive object data representing an object to be manufactured by an additive manufacturing process. A derivation process on the object data to derive a data set representing the object, the data set having a predetermined number of data fields. The data set is provided to data processing system comprising data based on previously determined manufacturing orientations and/or position. An output is received from the data processing system representing a manufacturing orientation and/or manufacturing position of the object.

15 Claims, 8 Drawing Sheets

300 receive object data representing an object to be manufactured by an additive manufacturing process
302 perform a derivation process on the object data to derive a data set representing the object, the data set having a predetermined number of data fields
304 provide the data set to a data processing system comprising data based on previously determined manufacturing orientations and/or positions
306 receive an output from the data processing system representing a manufacturing orientation and/or manufacturing position of the object
308

(51) Int. Cl.

| | |
|---|---|
| ***B22F 10/85*** | (2021.01) |
| ***B29C 64/386*** | (2017.01) |
| ***B33Y 50/00*** | (2015.01) |
| ***G05B 19/402*** | (2006.01) |
| ***G06T 17/00*** | (2006.01) |
| ***G06T 17/20*** | (2006.01) |
| *B22F 10/16* | (2021.01) |
| *B22F 10/28* | (2021.01) |
| *B29C 64/112* | (2017.01) |
| *B29C 64/165* | (2017.01) |
| *B29C 64/393* | (2017.01) |
| *B29K 77/00* | (2006.01) |
| *B33Y 10/00* | (2015.01) |
| *B33Y 30/00* | (2015.01) |
| *B33Y 50/02* | (2015.01) |
| *G06F 113/10* | (2020.01) |
| *G06N 3/045* | (2023.01) |
| *G06N 3/08* | (2023.01) |
| *G06N 5/01* | (2023.01) |

(52) U.S. Cl.

CPC ........... *G05B 19/402* (2013.01); *G06F 30/00* (2020.01); *G06T 17/00* (2013.01); *G06T 17/20* (2013.01); *B22F 10/16* (2021.01); *B22F 10/28* (2021.01); *B29C 64/112* (2017.08); *B29C 64/165* (2017.08); *B29C 64/393* (2017.08); *B29K 2077/00* (2013.01); *B33Y 10/00* (2014.12); *B33Y 30/00* (2014.12); *B33Y 50/02* (2014.12); *G05B 2219/49023* (2013.01); *G06F 2113/10* (2020.01); *G06N 3/045* (2023.01); *G06N 3/08* (2013.01); *G06N 5/01* (2023.01); *Y02P 10/25* (2015.11)

(58) Field of Classification Search

CPC ......... B33Y 30/00; B33Y 50/02; G06F 30/00; B22F 10/14; B22F 10/85; B22F 10/16; B22F 10/28; G05B 19/402; G05B 2219/49023; G06T 17/00; G06T 17/20; Y02P 10/25; G06N 3/045; G06N 5/01; G06N 3/08; B29K 2077/00

USPC .............................................................. 703/1

See application file for complete search history.

(56) References Cited

U.S. PATENT DOCUMENTS

| | | | | |
|---|---|---|---|---|
| 9,855,698 | B2 | 1/2018 | Perez et al. | |
| 2007/0233298 | A1 | 10/2007 | Heide et al. | |
| 2015/0331402 | A1 | 11/2015 | Lin et al. | |
| 2017/0269575 | A1* | 9/2017 | Halperin | G06F 30/00 |
| 2017/0293286 | A1 | 10/2017 | Aggarwal et al. | |
| 2018/0117850 | A1* | 5/2018 | Schwartz | B29C 64/393 |
| 2018/0120813 | A1 | 5/2018 | Coffman et al. | |

FOREIGN PATENT DOCUMENTS

| | | | |
|---|---|---|---|
| EP | 3327593 | A1 | 5/2018 |
| WO | WO-2018127827 | A1 | 7/2018 |

OTHER PUBLICATIONS

J. Barhak et al. Parameterization and reconstruction from 3D scattered points based on neural network and PDE techniques. IEEE Transactions on Visualization and Computer Graphics vol. 7 No. 1 Jan.-Mar. 2001 Abstract Chapter 4.

* cited by examiner

600

OBJECT ORIENTATION AND/OR POSITION FOR ADDITIVE MANUFACTURING

BACKGROUND

Apparatus that generate three-dimensional objects, including those commonly referred to as "3D printers", may be used to produce a wide-range of three-dimensional objects. These apparatuses may receive a definition of the three-dimensional object in the form of an object model. This object model is processed to instruct the apparatus to produce the object using a production material. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the production of three-dimensional objects, e.g. in additive manufacturing processes such as so-called "3D printing", there is a challenge to control object characteristics such as the appearance of generated objects, for example the surface finish or texture of generated objects accuracy characteristics such as dimensional characteristics and mechanical characteristics.

Appearance characteristics that may be affected include the formation of capillaries or sinks in the object, surface finish and texture and stair stepping. Stair stepping is an effect that is manifested by producing a stepped surface where a smooth surface is specified. Accuracy characteristics that may be affected include dimensional linear accuracy, roundness and warping. Mechanical properties that may be affected include a tensile strength of the object and elongation at break.

Certain examples described herein facilitate manufacture of a three-dimensional object with desired appearance, mechanical and/or accuracy characteristics, in an automated fashion, enabling a non-skilled operator to use an automatic manufacturing orientation and/or position determination system to select and orientation and/or position appropriate to the desired object properties.

Figure 1:
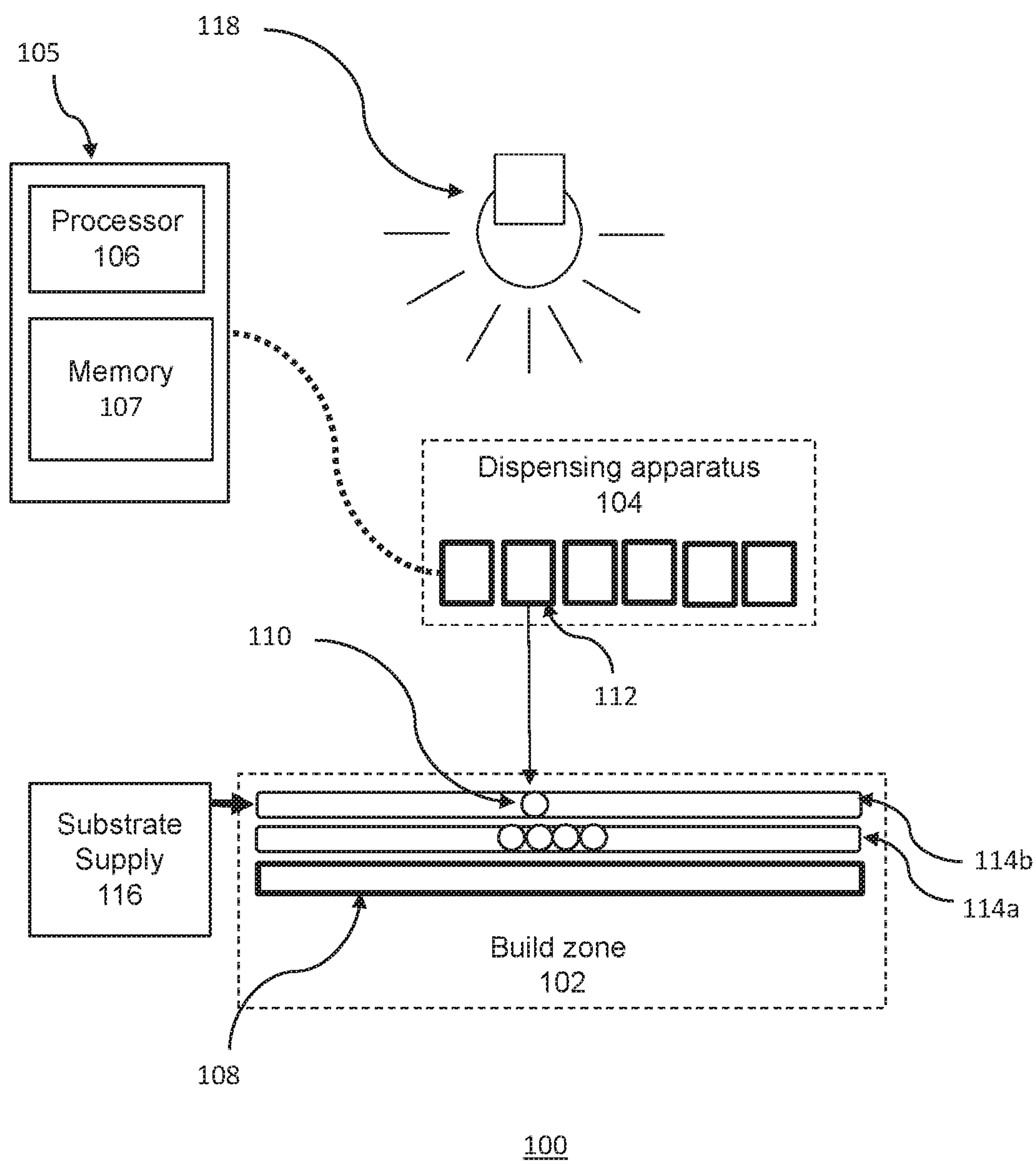
FIG. 1 is a schematic diagram of an apparatus to produce a three-dimensional object according to an example.

An example of an apparatus to produce a three-dimensional object will now be described with reference to FIG. 1. FIG. 1 shows an example of an additive manufacturing system 100 to produce a three-dimensional object 110. The additive manufacturing system 100 may comprise a so-called "3D printer". The additive manufacturing system 100 comprises a build zone 102, a dispensing apparatus 104, and a computing apparatus 105, the computing apparatus comprising a processor 105 and a memory 107.

Although, for ease of understanding, the present disclosure is made with reference to a particular method of additive manufacturing, the principles disclosed herein are generally applicable to any additive manufacturing process.

The build zone 102, which may comprise a build chamber (which may or may not be supplied together with the additive manufacturing system 100), may comprise a platen 108 upon which a three-dimensional object 110 may be constructed. The platen 108 may define a two-dimensional surface that acts as a reference plane for a coordinate system defined for the additive manufacturing system 100. For example, the platen 108 may be orientated to be horizontal and define an x-y plane in a three-dimensional coordinate system, where a third dimension representing a z-axis defines a height relative to the surface of the platen 108.

The dispensing apparatus 104 is to dispense, deposit, or otherwise apply a plurality of print agents to generate the three-dimensional object 110. The print agents may comprise, for example, clear and/or colored liquids (such as fusing or detailing agents) for use on a substrate.

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc.

In FIG. 1, the dispensing apparatus 104 is communicatively coupled to the computing apparatus 105, e.g. via a wired interface and/or via a wireless interface. The processor 106 including in the computing apparatus 105 may be programmed to control the dispensing apparatus 104 based on manufacturing control data. The manufacturing control data may indicate placement instructions for the plurality of print agents. For example, these instructions may comprise, or may be used to generate, firing signals for at least one print head 112 to deposit a particular print agent. These firing signals may be associated with a particular location in two-dimensional space.

The dispensing apparatus 104 may be moveable relative to the platen 108 in order to deposit a print agent at a particular location. The three-dimensional object 110 may be constructed layer-by-layer, in which case the dispensing apparatus 104 may deposit print agent onto each formed layer of build material. In this case, placement instructions may relate to the placement of an available print agent or print agent combination at a particular print-resolution pixel for a particular layer (e.g. to deposit a print agent composition for a voxel location associated with the layer).

The dispensing apparatus 104 may, in certain examples, comprise an inkjet deposit mechanism. In the example of FIG. 1, the apparatus is to print a plurality of liquid agents onto layers of a build material substrate 114. The build material substrate may be a particulate material, such as a powder or powder-like material. According to one example, a suitable build material may be PA12 build material commercially known as V1R10A "HP PA12" available from HP Inc. In another example, a metal build material may be used. In some examples, the dispensing apparatus 104 may comprise first and second dispensers. In this example, the dispensing apparatus 104 comprises six inkjet print heads 112. Each inkjet print head 112 may be to deposit a print agent onto the build material substrate 114, In particular, each inkjet print head 112 may be to deposit a particular print agent upon defined areas of a plurality of successive layers of the build material substrate 114. In one example, one print agent may act as a fusing agent, and another print agent may act or as detailing agent (e.g. a fusing inhibitor). In other examples, the dispensing apparatus 104 may deposit a print agent that acts as a fusing agent and may omit print agents that act as a detailing agent.

In FIG. 1, the additive manufacturing system 100 comprises a substrate supply mechanism 116 to supply at least one substrate layer onto which the plurality of agents may be dispensed, deposited or otherwise applied by the dispensing apparatus 104. In this example, the substrate supply mechanism 116 comprises a powdered substrate supply mechanism to supply successive layers of powdered substrate 114. Two layers are shown in FIG. 1: a first layer 114*a* onto which a second layer 114*b* has been deposited by the substrate supply mechanism 116. In certain cases, the substrate supply mechanism 116 is to move relative to the platen 108 so that successive layers may be deposited on top of each other.

In some examples, the substrate supply mechanism 116 may dispense a layer of powdered substrate 114 having a fixed thickness. In other examples, the substrate supply mechanism may dispense each layer of powdered substrate 114 according to a specified thickness and the thickness of one of the layers of powdered substrate 114 may be the same or different to one or more other layers of powdered substrate 114.

In the present example, the apparatus also comprises a fuser 118 to apply energy to form portions of the three-dimensional object from the powdered substrate 114. For example, FIG. 1 shows a particular print head 114 depositing a controlled amount of a liquid, or print, agent onto an addressable area of the second layer of powdered substrate 114*b*. The liquid agent is deposited onto the powdered substrate and, as such, a drop of agent on an addressable area unit of the layer relates to a print resolution voxel of an object model. The height of the voxel in its associated voxel location is determined by the depth of each layer of substrate 114. The placement instructions discussed above may control the operation of the print head 112 to form the associated voxel location. Following application of the agent, the fuser 118 is to solidify the portion of the layer of substrate 114*b*. For example, the fuser 118 may apply electromagnetic radiation within a wavelength range to the layer of substrate 114*b*. The application of electromagnetic radiation may melt, sinter or fuse the build material of the layer of substrate 114*b* where fusing agent has been applied, and solidifies upon cooling. In certain examples, the fuser 118 may comprise an energy source such as a ultra-violet or infra-red light source, e.g. a lamp or laser. FIG. 1 shows four print resolution voxels locations that have been formed in the first layer 114*a*. As such, a voxel location in the second layer 114*b* may be built on voxels locations formed in the first layer 114*a* to build the three-dimensional object. Lower layers of the build material substrate 114 may also provide support for overhanging portions of a three-dimensional object, so that the build material substrate may be removed at the end of production to reveal the completed object.

In the example shown in FIG. 1, there may be, for example, six print agents, with each print agent having a different property. For example, four of the print agents may comprise colorants to provide a full color space for producing three-dimensional objects. One of the print agents may be a black fusing agent. One of the print agents may be a substantially colorless, or neutrally-colored, electromagnetic radiation absorbing agent. One of the print agents may be a detailing agent to cool the substrate or otherwise prevent fusion of the particulate material of the substrate.

The processor 106 may control the dispensing apparatus 104 to dispense, deposit or apply different agents in accordance with the placement instructions. In certain examples, the placement instructions may specify colors, structural properties, or other properties, to be formed in various portions of the three-dimensional object 110. The processor 106 may determine the relative amounts of different fusing agents, colorant agents, or other agents to achieve the specified properties of the manufactured object.

In some examples, the agents dispensed by the dispensing apparatus 104 may be applied on the layer of particulate build material.

The orientation and/or position of an object when being generated in the build zone 102 may affect characteristics of the generated object. The appropriate orientation and/or position may in turn depend on geometric properties of the object. For example, if the object has an orientation such that the plane of a planar surface of the object forms a relatively small angle with the x-y plane of the platen 108, stair stepping may be more likely to occur, so orientating the object so that it forms a relatively large angle with respect to the x-y plane of the platen may prevent or mitigate stair stepping. In another example, if the object is positioned near the center of the build zone 102, it will tend to cool more slowly than if the object is positioned near an edge of the build zone 102, for example near the top or side of the build zone. The rate of cooling in turn may affect the characteristics (properties) of the object. For example, a slower cooling process may result in favorable dimensional and appearance properties of the object, because a slower cooling process may result in less material contraction tension, warping and a more controlled of cooling process. On the other hand, a faster cooling process may result in favorable mechanical properties, because it may avoid the formation of microstructural grans, resulting in, for example, higher elongation at break. A part of the object susceptible to e.g. warping may therefore be placed near the center of the build zone 102 may therefore result in favorable mechanical properties. In another example, orientating and/or positioning a part of an object susceptible to the formation of sinks near or at an edge or top of the build zone 102 may prevent or reduce the formation of sinks.

Figure 2:
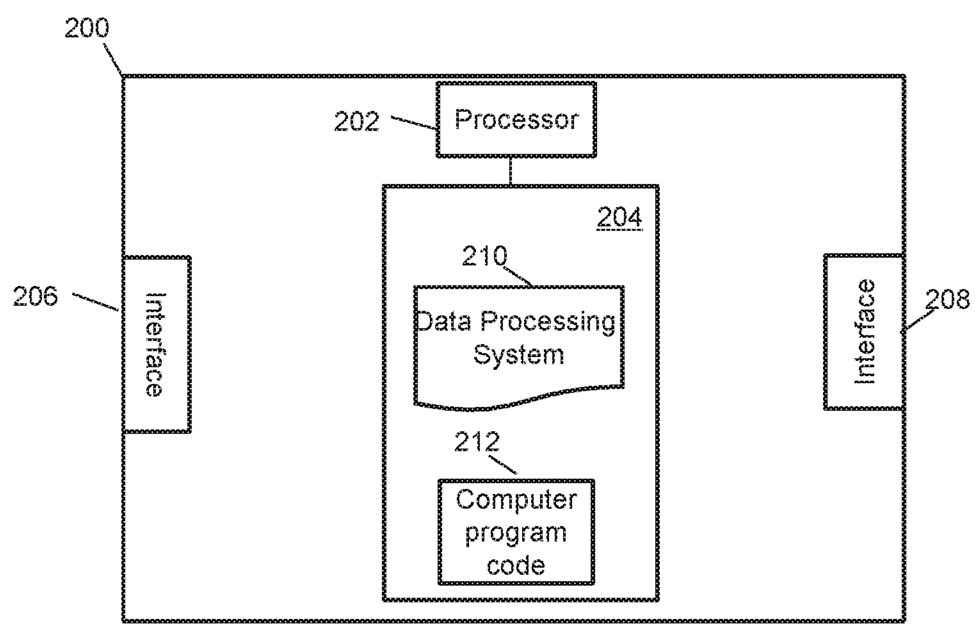
FIG. 2 is a schematic diagram of a computing apparatus according to an example.

FIG. 2 shows an example of an apparatus, in the form of a computing apparatus 200, according to an example. The computing apparatus 200 may be an example of the computing apparatus 106 illustrated in FIG. 1 or may be a separate apparatus. The computing apparatus 200 in FIG. 2 comprises a processor 202, a first interface 206, a second interface 208 and a storage media 204. The processor 202 may comprise more than one processing units, for example more than one core. The processor 202 may form part of an integrated control circuit, such as an Application Specific Integrated Circuit (ASIC) or Field Programmable Gate Array (FPGA). The storage media 204 may be a non-transitory computer-readable storage medium and may comprise data storage electronics such as registers, memory and/or storage devices. Registers and memory may comprise random access memory (RAM) and/or read-only memory (ROM), where in the latter case, the memory may comprise an electrically erasable programmable read-only memory (EEPROM). The storage media 204 may comprise multiple independent storage media or may comprise different portions of a common storage medium, e.g. different portions of a memory, solid state storage device and/or hard disk drive. The first interface 206 comprises an input interface to receive object data. The first interface 206 may comprise an interface for an internal control bus, or an interface for an external communications medium, such as a Universal Serial Bus connection or a network coupling. The second interface 208 comprises an output interface to output data representing a manufacturing orientation and/or manufacturing position. The second interface 208 may comprise an interface for an internal control bus, or an interface for an external communications medium, such as a Universal Serial Bus connection or a network coupling. In some examples, the first interface 206 is the same interface as the second interface 208.

In FIG. 2, the storage media 204 is communicatively coupled to the at least one processor 202 and is arranged to store a data processing system (DPS) 210 and computer program code 212. The DPS 210 comprises data based on previously determined manufacturing orientations and/or positions. The DPS 210 may comprise a look-up table or look-up tables comprising data indicating previously determined manufacturing orientations and/or positions for different types of object, for example. In one example, the DPS 210 comprises a machine learning system, such as a logic tree model, a sparse principle component analysis (PCA) model, a k-nearest neighbor algorithm or a neural network (NN) such as a convolutional neural network (CNN).

The computer program code 212 may comprise instructions that can be executed by the processor 202.

Figure 3:
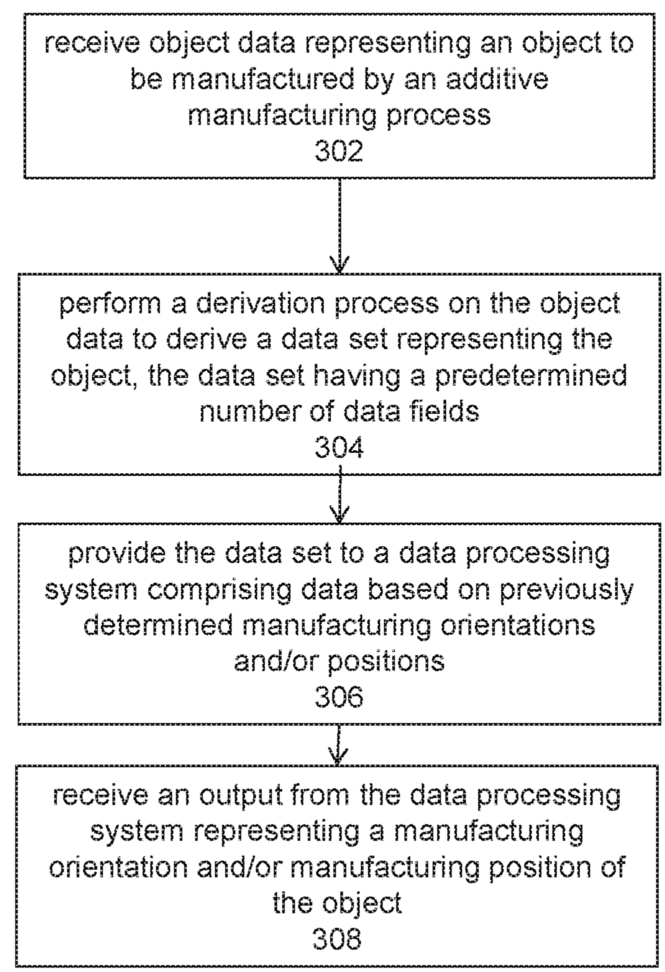
FIG. 3 is a flow diagram showing a method for selecting a manufacturing orientation and/or manufacturing position of an object to be formed by an additive manufacturing apparatus according to an example.

FIG. 3 shows an example method 300 for selecting a manufacturing orientation and/or manufacturing position of an object to be formed by an additive manufacturing apparatus, such as the additive manufacturing apparatus shown in FIG. 1. The method 300 may be implemented by the computing apparatus 200, for example by the at least one processor 202. In one example, the method 300 is implemented by the at least one processor 202 based on the computer program code 212.

At block 302, object data representing an object to be manufactured by an additive manufacturing process is received. In one example, the object data comprises planar surface data representing a plurality of planar surfaces of the object. For example, the object data may be in the form of a stereolithography (.STL) file or a 0.3 mf file. Such a file may comprise data representing a plurality of planar surfaces comprising triangular, or other shaped, segments which combine to form a surface of a three-dimensional object to be manufactured. The object data may be received at the at least one processor 202 via the first interface 204, for example.

At block 304, a derivation process is performed on the planar surface data to derive a data set representing the object, the data set having a predetermined number of data fields. The data set may comprise a vector having a predetermined (fixed) number of elements. This data set is herein referred to as the "input data set".

At block 306, the input data set is provided to the DPS 210. At block an output is received from the DPS 210 representing a manufacturing orientation and/or manufacturing position of the object.

Output data, derived from the output received from the DPS 210, indicating the manufacturing orientation and/or position of the object may be provided via the second interface 208, for example. In one example, the output data is provided to the additive manufacturing system 100, which may then manufacture the object on the basis of the manufacturing orientation and/or position specified in the output. A manufacturing orientation may be indicated in the form of angular information with respect to a direction perpendicular to a plane of a reference, such as the x-y plane mentioned above for example. A manufacturing position may be indicated by providing three dimensional coordinates indicating a position in the build zone 102, for example.

Additionally or alternatively, the output data may result in display data being displayed to a user, for example on a display screen (not shown) indicating a manufacturing orientation and/or manufacturing position of the object. The display data may comprise the angular or coordinate information described above and/or a graphical representation of the object, for example. The user may provide an input to confirm that the object should be manufactured based on the orientation and/or position indicated, or to change the orientation and/or position. In some examples, the output data may indicate a plurality of candidate orientations and/or positions, and the user may then be given an option to select an orientation and/or position from the candidates indicated.

Use of a DPS 210 comprising data based on previously determined manufacturing orientations and/or positions enables knowledge acquired from previous examples, for example the know-how of an expert, to be used to determine a manufacturing orientation and/or position to be emulated in an automated fashion, without the use of highly complex algorithms which attempt to take into account all of the many different factors which determine an optimum or desired orientation and/or position. In some examples, the DPS 210 comprises a machine learning system trained according to a training process as described below, for example, based on previous examples in which an expert has selected the manufacturing orientation and/or position Deriving an input data set having a predetermined number (e.g. a fixed number, which does not vary depending on the object being processed) of data fields from the planar surface data makes it possible to provide data to the DPS 210 in a standardized form, enabling it to be processed by the DPS 210 in a consistent way, irrespective of properties such as the shape of the object to be manufactured. Because the input data set includes a predetermined number of data fields, the DPS 210 can process the input data sets consistently, irrespective of factors such as a number of planar surfaces used to represent the object in the object.

Figure 4:
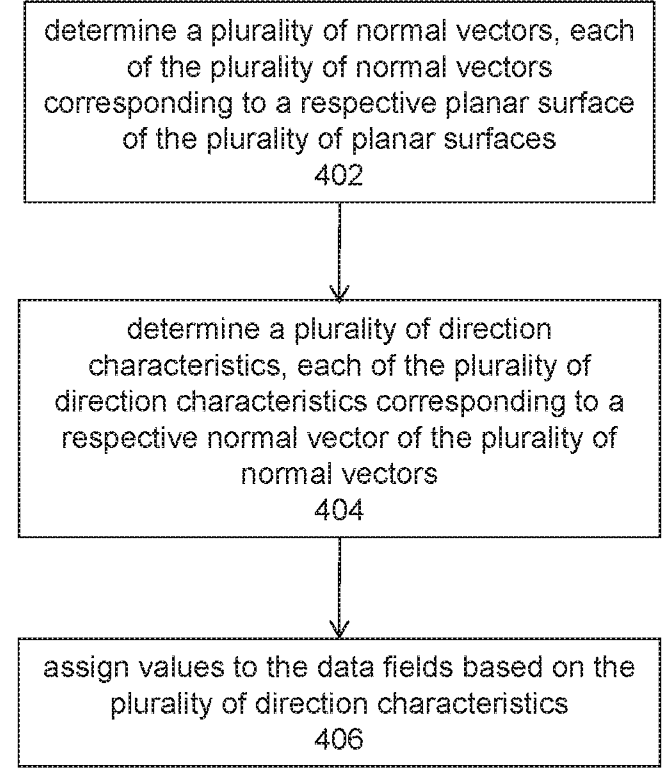
FIG. 4 is a flow diagram showing a derivation process for deriving a data set representing an object according to an example.
Figure 5:
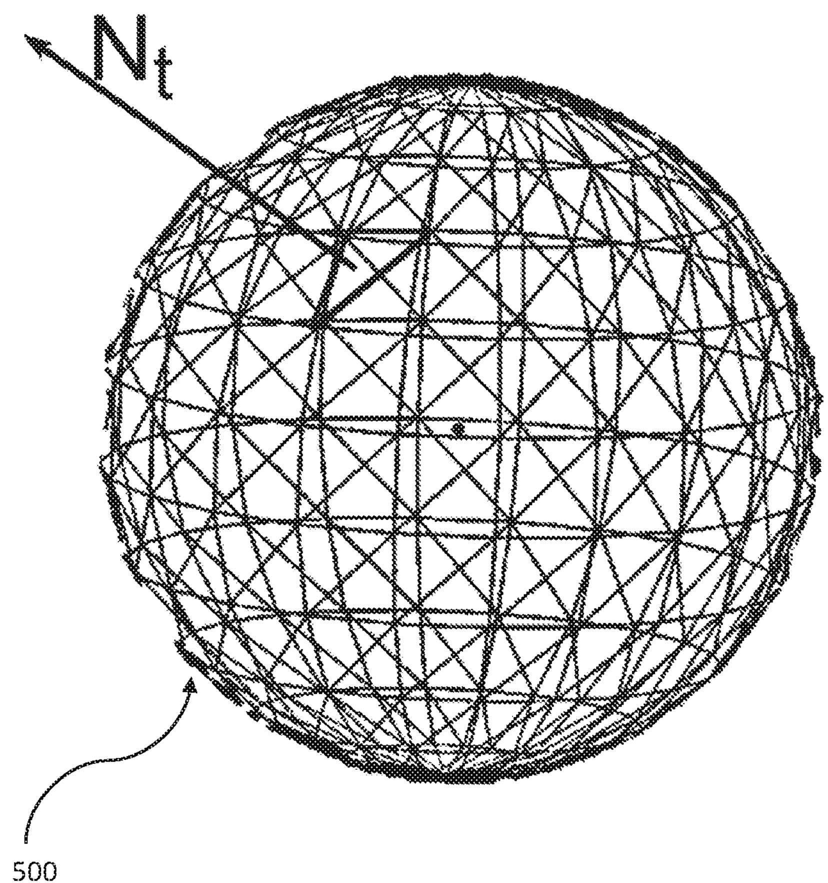
FIG. 5 is a schematic diagram showing an example object to be manufactured.

FIG. 4 illustrates an example of derivation process, in an example in which the object data comprises planar surface data representing a plurality of planar surfaces. At block 402 a plurality of normal vectors of the object to be manufactured are determined, each corresponding to a respective planar surface of the plurality of planar surfaces representing the object. FIG. 5 illustrates an example object 500 and a normal vector $N_T$ to a planar surface. In the example of FIG. 5, the planar surface is a triangle; in other examples, different shapes may be used.

In some examples, each of the normal vectors is normalized to a predetermined length. For example, for a normal vector $N_T=(x, y, z)$ it may be set that $x^2+y^2+z^2=c$, where c is a constant, for example 1.

At block 404, a plurality of direction characteristics are determined, each of the plurality of direction characteristics corresponding to a respective normal vector of the plurality of normal vectors. The direction characteristics may comprise the set of coordinates of the normal vector, for example, and determining the direction characteristics may comprise determining values of the set of coordinates.

At block 404 values are assigned to the data fields of the input data set to be provided to the DPS 210 based on the determined direction characteristics. In one example, the input data set is a vector having a predetermined number of data fields.

In an example, the values assigned to the data fields are based on a distribution (e.g. histogram) of the plurality of direction characteristics. This enables the angular properties of the object to be represented in the input data set. In an example, the distribution is weighted according to an area of the planar surface to which a respective normal vector corresponds. The distribution may be weighted in proportion to the areas of the respective planar surfaces. For example, a first normal vector corresponding to a first planar surface having an area twice as large as a second planar surface may be given twice the weight of a second normal vector corresponding to the second planar surface. This enables the geometric properties of the object to be represented in the input data set.

Figure 6:
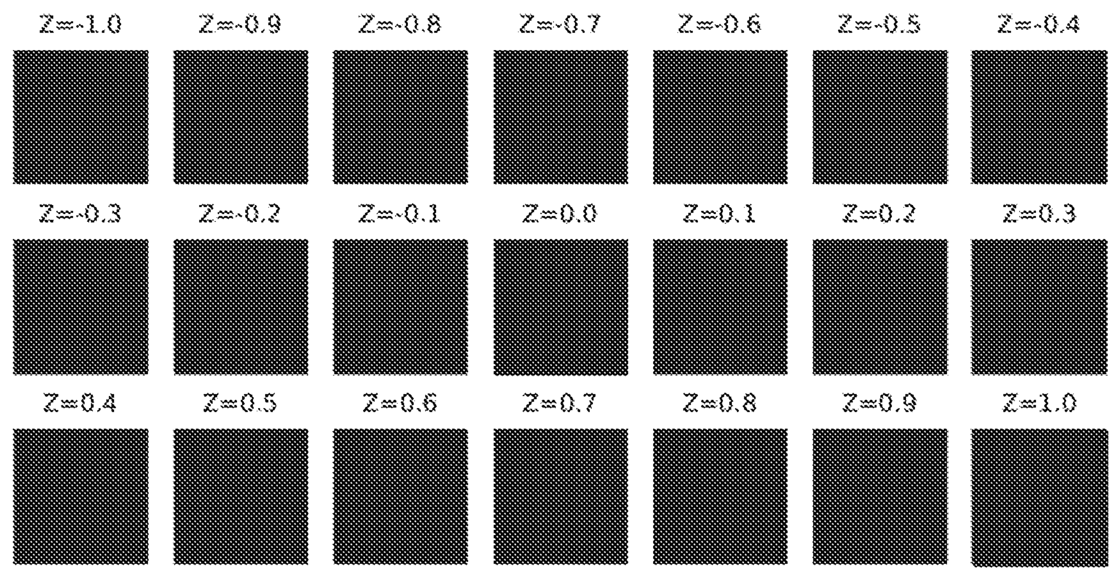
FIG. 6 is a schematic diagram illustrating an example of a discrete value set.

In an example, for each normal vector $N_T=(x, y, z)$, the value of each of x, y and z to one of a plurality of discrete values in a discrete value set. In one example, the discrete value set is comprised of values between 1 and −1 separated by intervals of 0.1, so that $x, y, z \in [-1, -0.9, \ldots, 0, \ldots, 0.9, 1]$. FIG. 6 illustrates schematically a discrete value set 600 corresponding to the z coordinate according to such an example. It will be appreciated that the x and y coordinates may have corresponding discrete value sets. In this example, the discrete value set 600 includes 21 different values, which may be referred to as "bins". Each of the coordinate values x, y, z of the normal vector may be categorized into a bin having a value closest to the determined value of the coordinate. For example, if the z value of a given normal vector is determined to have a value of 0.213, it is assigned a discrete value of 0.2.

As mentioned above, the input data set provided to the DPS 210 may have a predetermined number of data fields. In an example, each data field corresponds to a combination of the discrete values from the discrete value sets for each of the x, y, z coordinates. Accordingly, each data field represents a discrete combination of coordinate values. In the above example, in which the discrete values set for each of the x, y, z coordinates comprises 21 values, the input data set to be includes a total of 21×21×21=9261 data fields, each representing a different combination of coordinates.

The distribution of directions of the normal vectors to the planar surfaces representing the object may thus be represented by assigning values to each of the data fields in the input data set, the assigned values corresponding to the number of normal vectors having a direction corresponding to the direction represented by the data field. As mentioned above, these values may be weighted according to the area of the corresponding planar surface(s). The weighting to be assigned may be determined as a proportion of the total area of the planar surfaces making up the object. For example, for a planar surface P having an area A, the weighting applied is $W=A/A_T$, where $A_T$ is the sum of the areas of all of the planar surfaces representing the object. Thus, a data field in the input data set representing the direction $d=(x_d, y_d, z_d)$ may be assigned a value $\Sigma_{n=1}^{n=N} A_{dn}/A_T$, where the $A_{dn}$ are the respective areas of the N planar surfaces with normal vectors having direction d.

Some of the data fields may be assigned a zero value. For example, where the normal vectors are normalized as described above, some combinations of coordinate values may not satisfy the normalization condition (e.g. $x^2+y^2+z^2=c$), and the corresponding fields in the input data set will therefore be set to zero. In this case, each of the data fields in the input data set which may be set to a non-zero value represents a different direction.

In this way, the input data set may represent the geometric properties of the object to be manufactured, by representing the proportion of the surface area having a normal vector in each of the directions represented in the input data set. The number of data fields in the input data set is determined by the number of coordinate combinations that are represented, and therefore does not depend on properties of the object or the data format etc. used to represent the object. The input data set can therefore be provided in a standardized form to the DPS 210. Data processing systems such as machine learning systems may use a consistent number of input data fields. For example, in the case that the DPS 210 comprises a neural network or system of neural networks, the number of input data fields may correspond to the number of input nodes of the neural network. The above-described processes therefore enable object data to be represented in a way which enables effective processing by the DPS 210 both during training and in subsequent use.

Figure 7:
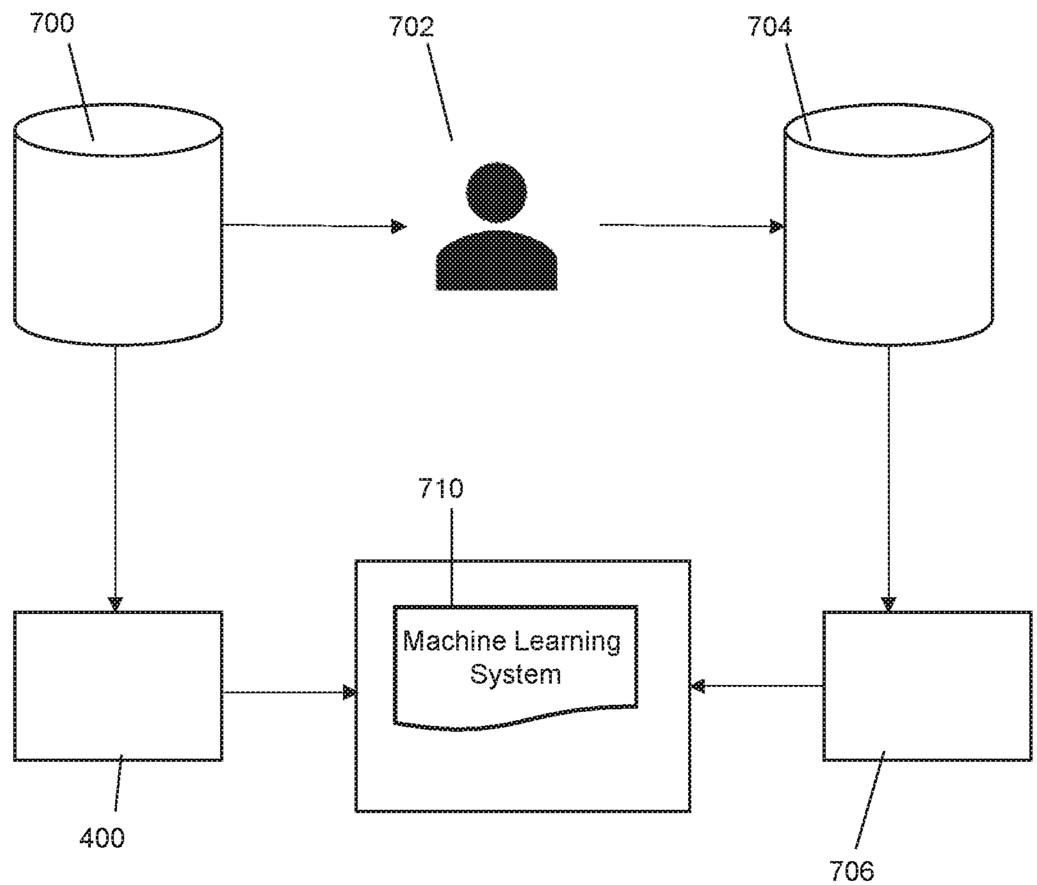
FIG. 7 is a schematic diagram illustrating a process for training a machine learning system according to an example.

As mentioned above, the DPS 210 may comprise a machine learning system. The methods described above may be used to train the machine learning system. FIG. 7 schematically illustrates a process for training a machine learning system 710, according to an example. An original object data set 700 representing an object is provided, in the form of a .STL or 0.3 mf file, for example. A user 702, for example a part quality expert, selects an appropriate position and/or orientation for each of the objects, thereby producing a modified object data set 704. A determination process 706 is performed to determine an orientation and/or position of each of the objects represented by the object data set 704 and provide an output representing same. Determining an orientation may comprise, for example, performing an Euler rotation to transform an object in the original object data set 700 to the corresponding object in the modified object data set 704, Determining a position may comprise, for example, performing a linear transformation to transform an object in the original object data set 700 to an object in the modified data set 704. The determination process produces outputs indicating preferred orientations and/or positions for the objects represented in the original object data set 700, as determined by the user.

The derivation process 400 described above is performed in relation to the object represented in the original object data set 700, to derive an input data set corresponding to the object. The input data set is provided as input to the machine learning system 710. The machine learning system 710 provides an output indicating an orientation and/or position of the object to which the input data set relates. The machine learning system 710 may be trained by iteratively comparing outputs from the machine learning system 710 to the output of the determination process 706 for the same object. In an example in which the machine learning system comprises a neural network, the output of the determination process is used as ground-truth data, and the parameters of the neural network are adjusted to reduce, for example, minimize a loss between the output of the determination process 706 and the output of the neural network. In some examples, a loss function such as a cross-entropy loss function may be used, which may enable the neural network to be trained in relatively few iterations.

The machine learning system 710 may include more than one machine learning component, such as more than one neural network. In some examples, different machine learning components of the machine learning system 710 may be trained according to different criteria, for example to prioritize different object characteristics. For example, a first machine learning component (for example, a first neural network) of the machine learning system 710 may be trained to prioritize mechanical properties of the object. In this case, the user 702 selects object orientations and/or positions that prioritize mechanical properties of the object over other characteristics. Similarly, a second machine learning component of the machine learning system 710 (for example, a second neural network) may be trained to prioritize appearance characteristics. In this case, the user 702 selects object orientations and/or positions that prioritize appearance over other characteristics. Further, a third machine learning component of the machine learning system 710 (for example, a third neural network) may be trained to prioritize accuracy characteristics. In this case, the user 702 selects object orientations and/or positions that prioritize accuracy over other characteristics.

The training processes described above may be performed, at least in part, on a computing apparatus such as the computing apparatus 200 described above, or on another computing apparatus.

After training, the machine learning system 710 may be deployed for use as described above. In some examples, the machine learning system 710 may continue to be trained after deployment, for example based on the user selection of candidate positions and/or orientations described above. The machine learning system 710 may be stored on storage media 204, for example. The machine learning system 710 may enable an object characteristic to be selected and a manufacturing orientation and/or position determined in a way which prioritizes the selected object characteristic. In one example, a user input to indicate an object characteristic is received via a user interface, such as the first interface 206. The processor 202 may then select a machine learning component from a plurality of machine learning components (for example, the first, second and third components described above) based on the user input. The input data may then be provided to the selected machine learning component, and an output generated which indicates a manufacturing orientation and/or manufacturing position which prioritizes the selected object characteristic.

Examples in which the DPS 210 is a system other than a machine learning system 710 may also enable the object data to be processed differently depending on a selected object characteristic. For example, a data processing component other than a machine learning component may be selected based on the user input. For example, in the case where the DPS 210 comprises look-up tables, different look-up tables may be provided to prioritize different object characteristics, and an appropriate look-up table selected based on the user input.

Figure 8:
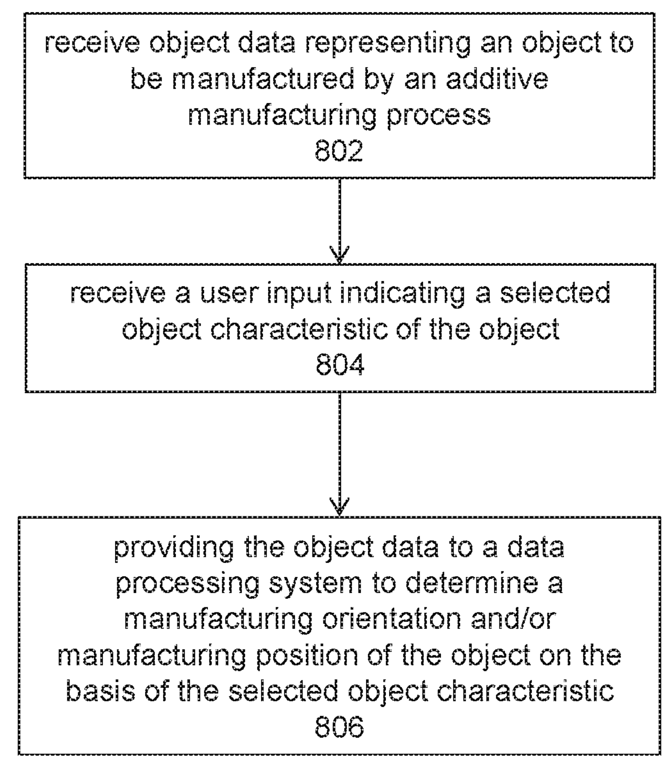
FIG. 8 is a flow diagram showing a method for selecting a manufacturing orientation and/or manufacturing position of an object to be formed by an additive manufacturing apparatus according to an example.

FIG. 8 shows an example method 800 for selecting a manufacturing orientation and/or manufacturing position of an object to be formed by an additive manufacturing apparatus, such as the additive manufacturing apparatus shown in FIG. 1. The method 800 may be implemented by the computing apparatus 200, for example by the at least one processor 202. In one example, the method 300 is implemented by the at least one processor 202 based on the computer program code 212.

At block 802, object data representing an object to be manufactured by an additive manufacturing process is received. The received object data may object data as described above, for example.

At block 804, a user input indicating a selected object characteristic of the object is received. The user input may be received via a user interface as described above. The object characteristic may be one of an appearance characteristic, a mechanical characteristic and an accuracy characteristic, for example.

At block 806, the object data is provided to a data processing system to determine a manufacturing orientation and/or manufacturing position of the object on the basis of the selected object characteristic. The data processing system may be any data processing system 210 as described above.

In one example, the method 800 may comprise comprising receiving an output from the data processing system representing a manufacturing orientation and/or position of the object. The output data may be as described above in relation to FIG. 3, for example.

In one example, the method 800 may comprise receiving an indication that a manufacturing orientation and/or manufacturing position of the object is to be determined automatically. The indication may be provided by user, via a user interface, for example. The object data may be provided to the data processing system in response to receipt of the indication.

Figure 9:
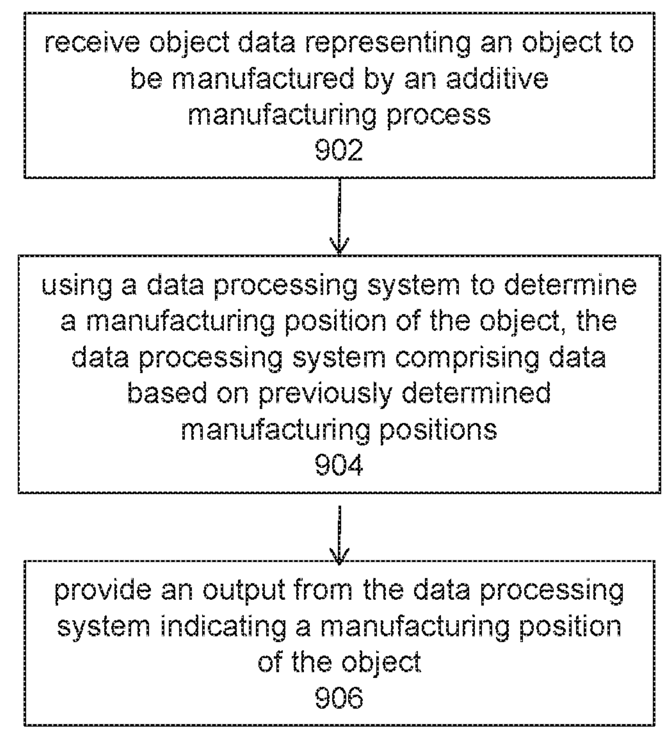
FIG. 9 is a flow diagram showing a method for selecting a manufacturing orientation and/or manufacturing position of an object to be formed by an additive manufacturing apparatus according to an example.

In some examples, both a manufacturing orientation and a manufacturing position of an object to be manufactured are determined. In other examples, either a manufacturing orientation or a manufacturing position is determined. FIG. 9 shows an example method 900 for selecting a manufacturing position of an object to be formed by an additive manufacturing apparatus, such as the additive manufacturing apparatus shown in FIG. 1. The method 300 may be implemented by the computing apparatus 200, for example by the at least one processor 202. In one example, the method 300 is implemented by the at least one processor 202 based on the computer program code 212.

At block 902 object data representing an object to be manufactured by an additive manufacturing process is received. The position may be a position within a build zone 102 of an additive manufacturing system for example.

At block 904 a data processing system is used to determine a manufacturing position of the object, the data processing system comprising data based on previously determined manufacturing positions. The data processing system may comprise any DPS 210 as described above.

At block 906, the DPS 210 provides an output indicating a manufacturing position of the object.

Certain methods and systems as described herein may be implemented by a processor that processes computer program code that is retrieved from a non-transitory storage medium. For example, the method 300, the method 400, the method 800 and the method 900 described above with reference to FIGS. 3, 4, 8 and 9 may be implemented by computer program code that is implemented by a computing device, including a processor of a computing system embedded in a printing device.

The appropriate and/or desirable manufacturing and/or orientation may depend on characteristics of the additive manufacturing system with which the object is to be manufactured, such as the type of build material to be used, for example. In some examples, different DPS 210 may be trained and/or used for different additive manufacturing system characteristics.

The preceding description has been presented to illustrate and describe examples of the principles described. This description is not intended to be exhaustive or to limit these principles to any precise form disclosed. Many modifications and variations are possible in light of the above teaching. For example, although the preceding description has been presented with reference to an additive manufacturing apparatus that uses a fusing agent that absorbs electromagnetic radiation to cause build material to fuse, in other examples, the fusing agent may be a chemical binding agent. In other examples, the additive manufacturing apparatus may use no fusing agent and may instead fuse build material by directly applying focused energy from, for example, a laser beam or an electron beam.

Although in the above examples the DPS 210 was indicated as being stored in the storage media 204 of the computing apparatus 200, in some examples the DPS 210 may be stored in a different storage media. For example, the DPS 210 may be stored remotely from the computing apparatus 200, and the computing apparatus 200 may communicate with the DPS 200 over a data communications network such as the Internet, for example.

It is to be understood that any feature described in relation to any one example may be used alone, or in combination with other features described, and may also be used in combination with any features of any other of the examples, or any combination of any other of the examples,

What is claimed is:

1. A non-transitory machine-readable storage medium storing instructions executable by a processor to perform processing comprising:

receiving object data representing an object to be manufactured by an additive manufacturing process, the object data including planar surface data representing a plurality of planar surfaces of the object;

performing a derivation process on the planar surface data to derive a data set representing the object, the data set having a predetermined number of data fields regardless of a number of the planar surfaces of the object;

providing the data set as input to a machine learning system that has been trained on manufacturing orientations at which objects are to be manufactured by the additive manufacturing process such that the objects have specified accuracy or appearance characteristics;

receiving as output from the machine learning system a manufacturing orientation at which the object is to be manufactured by the additive manufacturing process to have the specified accuracy or appearance characteristics; and cause an additive manufacturing apparatus to generate the object by the additive manufacturing process at the manufacturing orientation received as output from the machine learning system.

2. The non-transitory machine-readable storage medium according to claim 1, wherein the derivation process comprises:

determining a plurality of normal vectors, each of the plurality of normal vectors corresponding to a respective planar surface of the plurality of planar surfaces;

determining a plurality of direction characteristics, each of the plurality of direction characteristics corresponding to a respective normal vector of the plurality of normal vectors; and assigning values to the data fields based on the plurality of direction characteristics.

3. The non-transitory machine-readable storage medium according to claim 2, wherein the derivation process comprises assigning values to the data fields based on a distribution of the plurality of direction characteristics.

4. The non-transitory machine-readable storage medium according to claim 3, wherein the distribution is weighted according to an area of the respective planar surface to which each of the plurality of normal vectors corresponds.

5. The non-transitory machine-readable storage medium according to claim 2, wherein each of the plurality of normal vectors comprises a vector normalized to a predetermined length, the plurality of direction characteristics each comprises a set of components of a corresponding normal vector, and determining each of the plurality of direction characteristics comprises determining values of the components of the corresponding normal vector, the data fields each represent a respective combination of vector coordinates, and values are assigned to the data fields according to a number of the normal vectors having a combination of vector coordinates corresponding to a respective data field, weighted according to an area of each planar surface to which each normal vector corresponds.

6. The non-transitory machine-readable storage medium according to claim 1, wherein the object data is provided in a stereolithography (.STL) file or a 0.3 mf file.

7. A system comprising:

a storage medium to store instructions and a machine learning system that has been trained on manufacturing orientations at which objects are to be manufactured by an additive manufacturing process such that the objects have specified accuracy or appearance characteristics; and a processor, wherein the instructions are executable by the processor to:

receive object data representing an object to be manufactured by the additive manufacturing process, the object data including planar surface data representing a plurality of planar surfaces of the object;

perform a derivation process on the planar surface data to derive a data set representing the object from the object data, the data set having a predetermined number of data fields regardless of a number of the planar surfaces of the object;

provide the data set as input to the machine learning system;

receive as output from the machine learning system a manufacturing orientation at which the object is to be manufactured by the additive manufacturing process to have the specified accuracy or appearance characteristics; and cause an additive manufacturing apparatus to generate the object by the additive manufacturing process at the manufacturing orientation received as output from the machine learning system.

8. The system according to claim 7, wherein the machine learning system comprises a first data processing component prioritizing the specified accuracy characteristic and a second data processing component prioritizing the specified appearance characteristic. and;

the instructions are executable by the processor to further:

receive user input indicating selection of the specified accuracy characteristic or the specified appearance characteristic;

select the first or the second data processing component according to the selection indicated by the user input; and provide the data set to the first or the second data processing component that has been selected.

9. The system according to claim 7, wherein the data processing system comprises a neural network system.

10. A method performed by a processor and comprising:

receiving object data representing an object to be manufactured by an additive manufacturing process, the object data including planar surface data representing a plurality of planar surfaces of the object;

receiving user input indicating whether the objected is to be manufactured to prioritize specified accuracy or appearance characteristics;

performing a derivation process on the planar surface data to derive a data set representing the object, the data set having a predetermined number of data fields regardless of a number of the planar surfaces of the object;

providing the data set and whether the object is to be manufactured to prioritize the specified accuracy or appearance characteristics, as input, to a machine learning system that has been trained on manufacturing orientations at which objects are to be manufactured by the additive manufacturing process such that the objects have the specified accuracy or appearance characteristics;

receiving as output from the machine learning system a manufacturing orientation at which the object is to be manufactured by the additive manufacturing process to have the specified accuracy or appearance characteristics; and causing an additive manufacturing apparatus to generate the object by the additive manufacturing process at the manufacturing orientation received as output from the machine learning system.

11. The method according to claim 10, wherein the derivation process comprises:

determining a plurality of normal vectors, each of the plurality of normal vectors corresponding to a respective planar surface of the plurality of planar surfaces;

determining a plurality of direction characteristics, each of the plurality of direction characteristics corresponding to a respective normal vector of the plurality of normal vectors; and assigning values to the data fields based on the plurality of direction characteristics.

12. The method according to claim 11, wherein the derivation process comprises assigning values to the data fields based on a distribution of the plurality of direction characteristics.

13. The method according to claim 12, wherein the distribution is weighted according to an area of the respective planar surface to which each of the plurality of normal vectors corresponds.

14. The method according to claim 11, wherein each of the plurality of normal vectors comprises a vector normalized to a predetermined length, the plurality of direction characteristics each comprises a set of components of a corresponding normal vector, and determining each of the plurality of direction characteristics comprises determining values of the components of the corresponding normal vector, the data fields each represent a respective combination of vector coordinates, and values are assigned to the data fields according to a number of the normal vectors having a combination of vector coordinates corresponding to a respective data field, weighted according to an area of each planar surface to which each normal vector corresponds.

15. The method according to claim 10, wherein the object data is provided in a stereolithography (.STL) file or a 0.3 mf file.

* * * * *